United States Patent
Gan et al.

(10) Patent No.: US 10,785,602 B2
(45) Date of Patent: Sep. 22, 2020

(54) INFORMATION PROCESSING METHOD AND APPARATUS

(71) Applicant: HUAWEI TECHNOLOGIES CO., LTD., Shenzhen (CN)

(72) Inventors: Yuanli Gan, Shenzhen (CN); Huaqi Hao, Shenzhen (CN); Chenglu Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 16/066,714

(22) PCT Filed: Dec. 28, 2015

(86) PCT No.: PCT/CN2015/099219
§ 371 (c)(1),
(2) Date: Jun. 28, 2018

(87) PCT Pub. No.: WO2017/113061
PCT Pub. Date: Jul. 6, 2017

(65) Prior Publication Data
US 2019/0020616 A1   Jan. 17, 2019

(51) Int. Cl.
G06F 15/16        (2006.01)
H04W 4/029        (2018.01)
(Continued)

(52) U.S. Cl.
CPC ........ *H04W 4/029* (2018.02); *G06F 16/9535* (2019.01); *H04L 51/14* (2013.01);
(Continued)

(58) Field of Classification Search
CPC ..... G06F 16/9535; G06Q 50/01; H04L 51/14; H04L 51/32; H04L 67/303; H04L 67/36; H04W 4/021; H04W 4/029
(Continued)

(56) References Cited

U.S. PATENT DOCUMENTS

| 2013/0162667 | A1* | 6/2013 | Eskolin | G06F 3/0488 345/619 |
| 2014/0082094 | A1* | 3/2014 | Bilgen | G06Q 50/01 709/206 |

(Continued)

FOREIGN PATENT DOCUMENTS

| CN | 103618668 A | 3/2014 |
| CN | 103905471 A | 7/2014 |

(Continued)

OTHER PUBLICATIONS

Queryfeed retrieved from internet on Jan. 13, 2020 URL: https://www.queryfeed.net > published on Sep. 15, 2015 as per Wayback Machine,total 1 page.
(Continued)

*Primary Examiner* — Liang Che A Wang
(74) *Attorney, Agent, or Firm* — Hauptman Ham, LLP

(57) ABSTRACT

An information processing method and apparatus are provided, and the method includes: obtaining identification information of first user equipment; determining second shared information, where the second shared information includes the identification information and is published by second user equipment that has an association relationship with the first user equipment; and sending the second shared information to the first user equipment.

15 Claims, 8 Drawing Sheets

(51) Int. Cl.
    *H04L 29/08*     (2006.01)
    *H04W 4/021*     (2018.01)
    *G06F 16/9535*     (2019.01)
    *H04L 12/58*     (2006.01)
    *G06Q 50/00*     (2012.01)

(52) U.S. Cl.
    CPC ............ *H04L 51/32* (2013.01); *H04L 67/303* (2013.01); *H04L 67/36* (2013.01); *H04W 4/021* (2013.01); *G06Q 50/01* (2013.01)

(58) Field of Classification Search
    USPC .................................. 709/204, 205, 206, 207
    See application file for complete search history.

(56) References Cited

U.S. PATENT DOCUMENTS

| | | | | |
|---|---|---|---|---|
| 2015/0097690 A1* | 4/2015 | Ady | ..................... | G08B 21/182 340/665 |
| 2015/0143391 A1* | 5/2015 | Ozawa | ................... | G01C 21/00 725/10 |
| 2016/0086241 A1* | 3/2016 | Proulx | .................... | H04L 67/22 705/26.4 |
| 2017/0032271 A1 | 2/2017 | Xu et al. | | |
| 2017/0134516 A1* | 5/2017 | Gutman | .................. | H04W 4/21 |
| 2018/0032997 A1* | 2/2018 | Gordon | ............. | G06Q 20/3224 |

FOREIGN PATENT DOCUMENTS

| | | |
|---|---|---|
| CN | 105095202 A | 11/2015 |
| WO | 2013141764 A1 | 9/2013 |
| WO | 2014081575 A1 | 5/2014 |

OTHER PUBLICATIONS

Office Action dated Jan. 13, 2020 from corresponding application No. AU 2015418705.

* cited by examiner

INFORMATION PROCESSING METHOD AND APPARATUS

CROSS-REFERENCE TO RELATED APPLICATIONS

This application is a national stage of International Application No. PCT/CN2015/099219, filed on Dec. 28, 2015, which is hereby incorporated by reference in its entirety.

TECHNICAL FIELD

This application relates to the field of computer technologies, and in particular, to an information processing method and apparatus.

BACKGROUND

With development of the mobile Internet and popularization of intelligent terminals, a user can send information such as a picture, text information, audio information, and a short video to a network by using a social platform of the intelligent terminal. As a result, the network is filled with a large amount of information, and most of the information is useless to the user. Users interact with each other by using the information published in the network, but the interaction between the users is a passive interaction. For example, a user A on travel publishes a picture by using the network, and all users that establish a friend relationship with the user A can see the picture published by the user A. If a user B, a friend of the user A, has many friends, the picture published by the user A may be immediately drowned by information published by other friends of the user B. Due to this passive interaction between users, the user cannot digest or make a selection from a huge amount of information in a timely manner, and cannot transmit, in a timely manner, selected information to a user that needs the transmission.

SUMMARY

Embodiments of the present invention provide an information processing method and apparatus, to provide a method for sending a message between user equipments, so that user equipment obtains information that is sent by user equipment having a same characteristic.

An embodiment of this application provides an information processing method, and the method includes:

obtaining identification information of first user equipment;

determining second shared information, where the second shared information includes the identification information and is published by second user equipment that has an association relationship with the first user equipment; and sending the second shared information to the first user equipment.

According to the method provided in this embodiment of the present invention, after the identification information sent by the first user equipment is obtained, the second shared information related to the identification information is determined from shared information published by the associated user equipment, and then the determined second shared information related to the identification information is sent to the first user equipment. Therefore, according to the method in this embodiment of the present invention, the second shared information of the second user equipment can be received by the first user equipment that published the same identification information as the second user equipment. In addition, the first user equipment obtains the second shared information related to the identification information that is sent by the first user equipment, so that the first user equipment is prevented from screening the shared information, and the first user equipment can more efficiently obtain the shared information related to the identification information that is sent by the first user equipment.

Optionally, the sending the second shared information to the first user equipment includes:

adding display attribute information to the second shared information, where the display attribute information is used for instructing the first user equipment to display the second shared information in a specified display interface; and sending, to the first user equipment, the second shared information carrying the display attribute information.

According to the foregoing method, a display interface used when the second shared information is displayed in the first user equipment may be specified, so that a user of the first user equipment is prevented from ignoring the second shared information.

Optionally, the second shared information includes one or more of the following:

text information;

picture information;

audio information; or video information.

Optionally, M pieces of second shared information that are most recently published in the second shared information that is published by the second user equipment and that is related to the identification information are sent to the first user equipment, where M is an integer, and a value of M may be preset.

According to the foregoing method, the first user equipment may be prevented from simultaneously receiving a large amount of second shared information related to the identification information, so that user experience is improved.

An embodiment of this application provides an information processing method, and the method includes:

sending, by first user equipment, identification information;

receiving, by the first user equipment, second shared information, and displaying or playing the shared information in a standby screen of the first user equipment, where the standby screen includes a lock screen interface and a home screen interface, and the second shared information includes the identification information and is published by second user equipment that has an association relationship with the first user equipment.

Optionally, the identification information is location information;

the receiving, by the first user equipment, second shared information, and displaying or playing the shared information in a standby screen of the first user equipment includes:

receiving, by the first user equipment, N pieces of second shared information, where N is a positive integer; and determining, by the first user equipment according to a distance between location information included in each of the received N pieces of second shared information and the identification information, an order of displaying or playing the N pieces of second shared information, and displaying or playing the N pieces of second shared information in the determined order.

According to the foregoing method, the first user equipment may display each piece of second shared information according to the location information, so that shared information in which the first user equipment is interested and that is closer to the first user equipment is determined more efficiently.

Optionally, the receiving, by the first user equipment, second shared information, and displaying or playing the shared information in a standby screen of the first user equipment includes:

receiving, by the first user equipment, N pieces of second shared information sent by the server; and displaying or playing, by the first user equipment, the N pieces of second shared information in chronological order in which the received N pieces of second shared information are published.

According to the foregoing method, the first user equipment may display each piece of second shared information in chronological order of publishing, so that second shared information that is published most recently is determined more efficiently.

Optionally, the second shared information is shared information published by the second user equipment in a social application program.

Optionally, the second shared information carries display attribute information, and the display attribute information is used for instructing the first user equipment to display the second shared information in a specified display interface; and the method further includes: displaying, by the first user equipment, the second shared information in the display interface specified in the display attribute information.

Optionally, the second shared information includes at least one of the following:
text information;
picture information;
audio information; or
video information.

Optionally, when the identification information is location information, and when the first user equipment determines that a variation of the identification information exceeds a threshold, the first user equipment sends updated identification information.

According to the foregoing method, the first user equipment may update location information of the first user equipment in real time, so that the pushed first shared information is more precise.

An embodiment of this application provides an information processing method, and the method includes:

obtaining identification information of first user equipment from first shared information of the first user equipment;

determining second user equipment, where the second user equipment has an association relationship with the first user equipment, and the second user equipment published second shared information related to the identification information; and sending the first shared information to the second user equipment.

According to the method provided in this embodiment of the present invention, after the identification information is obtained from the first shared information of the first user equipment, the first shared information is sent to the second user equipment that has an association relationship with the first user equipment and that published the second shared information related to the identification information. According to the method in this embodiment of the present invention, the first shared information published by the first user equipment can be accurately sent to the second user equipment that may be interested in the first shared information, so that the second user equipment is prevented from screening the shared information, and the second user equipment can more efficiently obtain the shared information related to the identification information that is sent by the second user equipment.

Optionally, the sending the first shared information to the second user equipment includes:

adding display attribute information to the first shared information, where the display attribute information is used for instructing the second user equipment to display the first shared information in a specified display interface; and sending, to the second user equipment, the first shared information carrying the display attribute information.

Optionally, the first shared information includes at least one of the following:
text information;
picture information;
audio information; or
video information.

Optionally, when publishing the first shared information including the identification information by using a social application program, the first user equipment sends a notification message to a server, so that the server determines that the first user equipment has published the first shared information.

An embodiment of this application provides an information processing method, and the method includes:

receiving, by second user equipment, first shared information published by first user equipment, where the first shared information includes identification information;

determining, by the second user equipment, that the second user equipment has an association relationship with the first user equipment and published second shared information related to the identification information; and displaying, by the second user equipment, the first shared information in a standby screen.

An embodiment of this application provides an information processing apparatus, and the apparatus includes:

an obtaining unit, configured to obtain identification information of first user equipment;

a determining unit, configured to determine second shared information, where the second shared information includes the identification information and is published by second user equipment that has an association relationship with the first user equipment; and a sending unit, configured to send the second shared information to the first user equipment.

Optionally, the sending unit is specifically configured to:
send, to the first user equipment, the second shared information carrying display attribute information, where the display attribute information is used for instructing the first user equipment to display the second shared information in a specified display interface.

An embodiment of this application provides an information processing apparatus, and the apparatus includes:

a sending unit, configured to send identification information;

a receiving unit, configured to receive second shared information; and a display unit, configured to display or play the shared information in a standby screen of first user equipment, where the standby screen includes a lock screen interface and a home screen interface, and the second shared information includes the identification information and is published by second user equipment that has an association relationship with the first user equipment.

Optionally, the identification information is location information;

the receiving unit is specifically configured to:

receive N pieces of second shared information, where N is a positive integer; and the display unit is specifically configured to:

determine, according to a distance between location information included in each of the received N pieces of second shared information and the identification information, an order of displaying or playing the N pieces of second shared information, and display or play the N pieces of second shared information in the determined order.

Optionally, the receiving unit is specifically configured to:

receive N pieces of second shared information sent by the server; and the display unit is specifically configured to:

display or play the N pieces of second shared information in chronological order in which the received N pieces of second shared information are published.

Optionally, the second shared information is shared information published by the second user equipment in a social application program.

Optionally, the receiving unit is specifically configured to receive the second shared information carrying display attribute information, where the display attribute information is used for instructing to display the second shared information in a specified display interface; and the display unit is specifically configured to display the second shared information in the display interface indicated in the display attribute information.

An embodiment of this application provides an information processing apparatus, and the apparatus includes:

an obtaining unit, configured to obtain identification information of first user equipment from first shared information of the first user equipment;

a determining unit, configured to determine second user equipment, where the second user equipment has an association relationship with the first user equipment, and the second user equipment published second shared information related to the identification information; and a sending unit, configured to send the first shared information to the second user equipment.

Optionally, the sending unit is further configured to:

send, to the second user equipment, the first shared information carrying display attribute information, where the display attribute information is used for instructing the second user equipment to display the first shared information in a specified display interface.

An embodiment of this application provides an information processing apparatus, and the apparatus includes:

a receiving unit, configured to receive first shared information published by first user equipment, where the first shared information includes identification information;

a determining unit, configured to confirm that second user equipment has an association relationship with the first user equipment and published second shared information related to the identification information; and a display unit, configured to display the first shared information in a standby screen.

An embodiment of this application provides an information processing device, and the device includes: a processor, a memory, and a transceiver;

the memory is configured to store a computer program; and the processor runs the computer program to perform the following procedure:

obtaining identification information of first user equipment;

determining second shared information, where the second shared information includes the identification information and is published by second user equipment that has an association relationship with the first user equipment; and instructing the transceiver to send the second shared information to the first user equipment.

Optionally, the processor is further configured to:

add display attribute information to the second shared information, where the display attribute information is used for instructing the first user equipment to display the second shared information in a specified display interface; and instruct the transceiver to send, to the first user equipment, the second shared information carrying the display attribute information.

An embodiment of this application provides an information processing device, and the device includes: a processor, a memory, and a transceiver;

the memory is configured to store a computer program; and the processor runs the computer program to perform the following procedure:

instructing the transceiver to send identification information and receive second shared information;

instructing the display to display or play the shared information in a standby screen, where the standby screen includes a lock screen interface and a home screen interface, and the second shared information includes the identification information and is published by second user equipment that has an association relationship with first user equipment.

Optionally, the identification information is location information;

the transceiver is specifically configured to:

receive N pieces of second shared information, where N is a positive integer; and the processor is specifically configured to:

determine, according to a distance between location information included in each of the received N pieces of second shared information and the identification information, an order of displaying or playing the N pieces of second shared information; and instruct, in the determined order, the display to display or play the N pieces of second shared information.

Optionally, the transceiver is specifically configured to:

receive N pieces of second shared information sent by the server; and the processor is specifically configured to:

instruct, in chronological order in which the received N pieces of second shared information are published, the display to display or play the N pieces of second shared information.

Optionally, the second shared information is shared information published by the second user equipment in a social application program.

Optionally, the processor is further configured to:

receive the second shared information carrying display attribute information, where the display attribute information is used for instructing the first user equipment to display the second shared information in a specified display interface.

Optionally, the second shared information includes at least one of the following:

text information;

picture information;

audio information; or video information.

An embodiment of this application provides an information processing device, and the device includes: a processor, a memory, and a transceiver;

the memory is configured to store a computer program; and the processor runs the computer program to perform the following procedure:

obtaining identification information of first user equipment from first shared information of the first user equipment;

determining second user equipment, where the second user equipment has an association relationship with the first user equipment, and the second user equipment published second shared information related to the identification information; and instructing the transceiver to send the first shared information to the second user equipment.

Optionally, the transceiver is further configured to:

send, to the second user equipment, the first shared information carrying display attribute information, where the display attribute information is used for instructing the second user equipment to display the first shared information in a specified display interface.

Optionally, the first shared information includes at least one of the following:

text information;
picture information;
audio information; or
video information.

An embodiment of this application provides an information processing device, and the device includes: a processor, a memory, and a transceiver;

the memory is configured to store a computer program; and the processor runs the computer program to perform the following procedure:

instructing the transceiver to receive first shared information published by first user equipment, where the first shared information includes identification information;

obtaining the identification information, and confirming that second user equipment has an association relationship with the first user equipment and published second shared information related to the identification information; and instructing a display to display the first shared information in a standby screen.

DESCRIPTION OF EMBODIMENTS

The following describes the embodiments of the present invention in detail with reference to the accompanying drawings in this specification.

In the embodiments of the present invention, user equipment may be a wireless terminal or a wired terminal, for example, may be a mobile phone, a computer, a tablet computer, a personal digital assistant (English: personal digital assistant, PDA for short), a mobile Internet device (English: mobile Internet device, MID for short), a wearable device, an e-book reader (English: e-book reader), and the like.

In the embodiments of the present invention, a server may be a wireless device or a wired device, for example, may be a device such as a computer. The server may be an x86 server or a non-x86 server. The server may support different operating systems.

Figure 1:
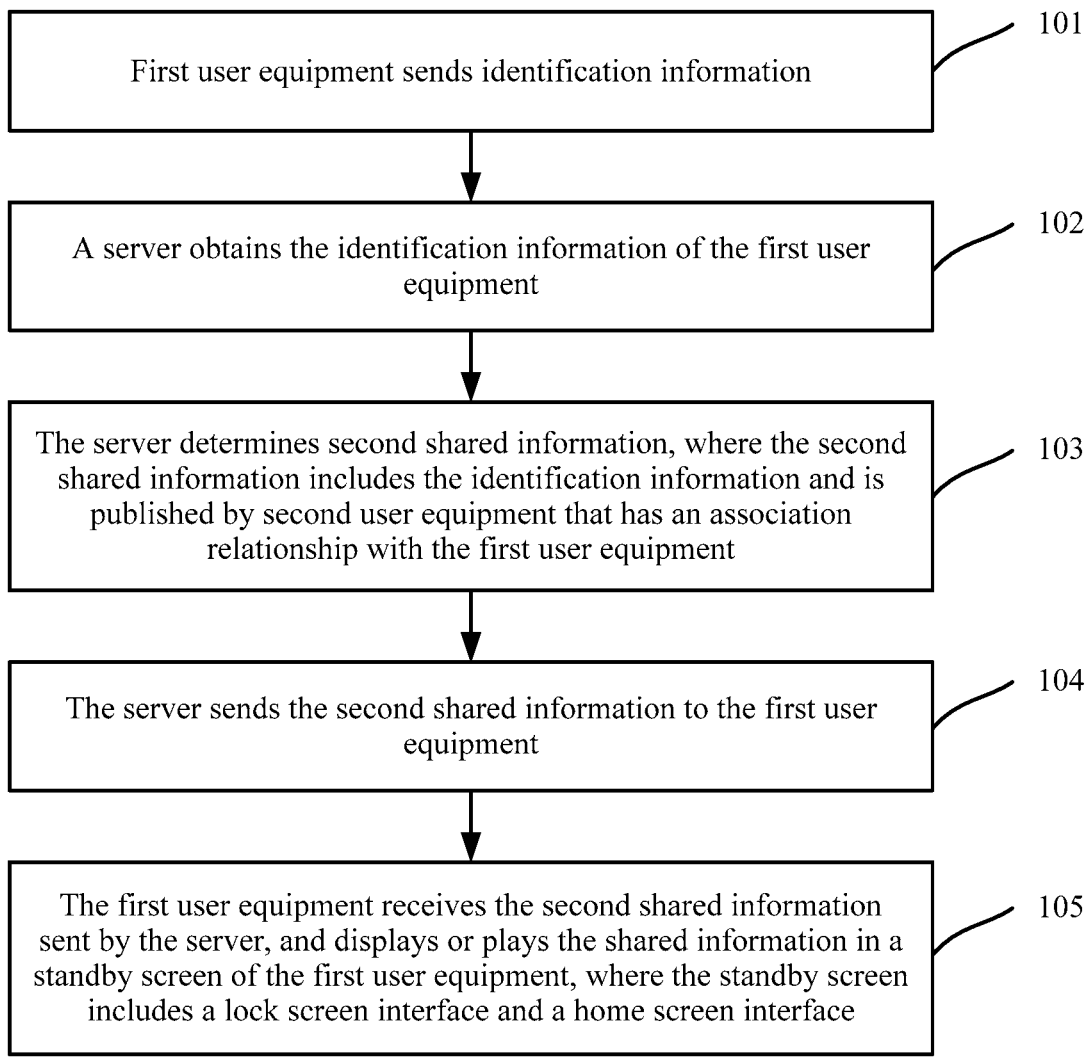
FIG. 1 is a schematic flowchart of an information processing method according to Embodiment 1 of this application.

Based on the foregoing description, as shown in FIG. 1, FIG. 1 is a schematic flowchart of an information processing method according to Embodiment 1 of this application.

Referring to FIG. 1, the method specifically includes the following steps.

Step 101: First user equipment sends identification information.

Step 102: A server obtains the identification information of the first user equipment.

Step 103: The server determines second shared information, where the second shared information includes the identification information and is published by second user equipment that has an association relationship with the first user equipment.

Step 104: The server sends the second shared information to the first user equipment.

It should be noted that in this embodiment of the present invention, step 102 to step 104 may be performed by the second user equipment or the server. For ease of description, only the server is used as an example for description herein. When step 102 to step 104 are performed by the second user equipment, reference may be made to the description in this embodiment of the present invention, and details are not described herein.

Step 105: The first user equipment receives the second shared information sent by the server, and displays or plays the shared information in a standby screen of the first user equipment, where the standby screen includes a lock screen interface and a home screen interface.

It should be noted that in this embodiment of the present invention, the first user equipment may replace the server to perform the method. For step 102 and step 103 that are performed by the first equipment, reference may be made to the description in this embodiment of the present invention. Step 104 may not be performed. Step 105 becomes: the first user equipment displays or plays the second shared information.

In step 101, the identification information may be a point of interest, location information, time information, or the like. The first user equipment may actively send the identification information to the server.

Optionally, when the identification information is location information, and when the first user equipment determines that a variation of the identification information exceeds a threshold, the first user equipment sends updated identification information to the server. For example, the threshold is 1000 meters, and the first user equipment moves from a location A to a location B that is 1500 meters away from the location A. In this case, the first user equipment may send updated location information to the server.

Optionally, when the identification information is a point of interest, and when the first user equipment determines that the point of interest changes, the first user equipment sends updated identification information to the server. For example, when a current point of interest is swimming, and a user updates the point of interest to badminton, the first user equipment sends, to the server, the updated point of interest: badminton.

In this embodiment of the present invention, the first user equipment may further publish first shared information including the identification information in a social application program, so that the server obtains the identification information by using the first shared information that is published by the first user equipment in the social application program.

Optionally, when the identification information is location information, the server may monitor the location information of the first user equipment, and when a location of the first user equipment changes, the server may detect a variation of the location information of the first user equipment in real time.

The first shared information published by the first user equipment may include at least one of the following:

text information; picture information; audio information; or video information.

Corresponding to step 101, in step 102, the server may directly receive the identification information sent by the first user equipment, or may obtain the identification information from the first shared information published by the first user equipment.

In step 103, the second shared information may include at least one of the following:

text information; picture information; audio information; or video information.

In this embodiment of the present invention, the association relationship indicates that a mapping relationship is pre-established between the first user equipment and the second user equipment. A specific association relationship may indicate that a communication identifier of the second user equipment exists in an address book of the first user equipment, and a communication identifier of the first user equipment exists in an address book of the second user equipment. Alternatively, the association relationship may indicate that there is a friend relationship between the first user equipment and the second user equipment in a social application program, or the first user equipment and the second user equipment register with a public server and are associated with each other, and so on. Certainly, the association relationship may be a relationship in another form, and this is not limited in this embodiment of the present invention. The association relationship may be saved in the server in a form such as a list or a text; or the association relationship may be saved in the user equipment, and the server may obtain, from the user equipment, the association relationship that is saved in a form such as a list or a text.

In step 103, the server determines the second user equipment that has an association relationship with the first user equipment by using the association relationship. In an actual implementation, there may be multiple user equipments that have an association relationship with the first user equipment.

The determining, by the server, the second user equipment that has an association relationship with the first user equipment may be triggered after the server obtains the identification information of the first user equipment. That is, the server obtains the identification information that is published or updated by the first user equipment to trigger the server to perform a subsequent operation.

For example, the association relationship indicates that a communication identifier of the second user equipment exists in an address book of the first user equipment, and a communication identifier of the first user equipment exists in an address book of the second user equipment. After obtaining the identification information of the first user equipment, the server may determine whether the communication identifier of the second user equipment exists in the address book of the first user equipment, and determine whether the communication identifier of the first user equipment exists in the address book of the second user equipment. If both exist, the server may determine that there is an association relationship between the first user equipment and the second user equipment.

The server may determine, by using the social application program, the second shared information that is published by the second user equipment and that is related to the identification information. For example, the second user equipment publishes shared information A that includes identification information X by using a first social application program, and publishes shared information B that includes the identification information X by using a second social application program. The server determines, according to the identification information X of the first user equipment, the shared information A that is published by the second user equipment by using the first social application program and the shared information B that is published by the second user equipment by using the second social application program, so that all second shared information that is published by the second user equipment and that is related to the identification information X is determined.

In this embodiment of the present invention, the second shared information related to the identification information may be second shared information including the identification information. For example, the identification information is a preset keyword Q. In this case, all shared information that includes "preset keyword Q" and that is in shared information published by the second user equipment may be used as the second shared information related to the identification information.

In this embodiment of the present invention, if the identification information is location information, the second shared information related to the identification information may be shared information including location information that is away from the identification information for less than a preset distance range. For example, the identification information is location information of an SU building, and the preset distance range is 1000 meters. In this case, shared information, in the shared information published by the second user equipment, that includes location information that is away from the SU building for less than 1000 meters may be used as the second shared information related to the identification information.

For example, the identification information is location information. The first user equipment shoots a picture in an HS scenic spot, the first user equipment publishes the picture as the first shared information by using the social application program, and at the same time, the first user equipment marks, in the first shared information, location information obtained when shooting the picture. The server may obtain the location information from the first shared information of the first user equipment. After obtaining the location information of the first user equipment, the server determines shared information, in the second shared information published by the second user equipment, that includes location information that is away from the location information of the picture for less than a preset range as the second shared information related to the location information of the first user equipment. For example, the second user equipment went to the HS scenic spot before, and published multiple pieces of shared information including pictures of the scenic spot when touring the HS scenic spot, and the server sends these pieces of shared information to the first user equipment.

In step 104, when the server sends the second shared information to the first user equipment, display attribute information may be carried in the second shared information, and the display attribute information is used for instructing the first user equipment to display the second shared information in a specified display interface. If the display attribute information is a lock screen interface, when receiving the second shared information, the first user equipment uses the second shared information as an element of the lock screen interface and generates the lock screen interface, so as to display the second shared information. Optionally, the display attribute information may also be a home screen interface, an idle interface, or the like.

Optionally, when sending the second shared information to the first user equipment, the server may further send an identifier of a social application program corresponding to the second shared information that is published by the second user equipment. The identifier of the social application program may be information such as a name of the social application program.

The server sends, to the first user equipment, M pieces of second shared information that are most recently published in the second shared information that is published by the second user equipment and that is related to the identification information, where M is an integer, and a value of M may be preset. In this way, the first user equipment can be prevented from simultaneously receiving a large amount of second shared information related to the identification information.

In step 105, when displaying the second shared information that is sent by the server and that is related to the identification information, the first user equipment may display the shared information at a location such as the home screen interface or the lock screen interface according to the display attribute information sent by the server, or may display the second shared information by using a notification bar or a pop-up window.

Figure 2:
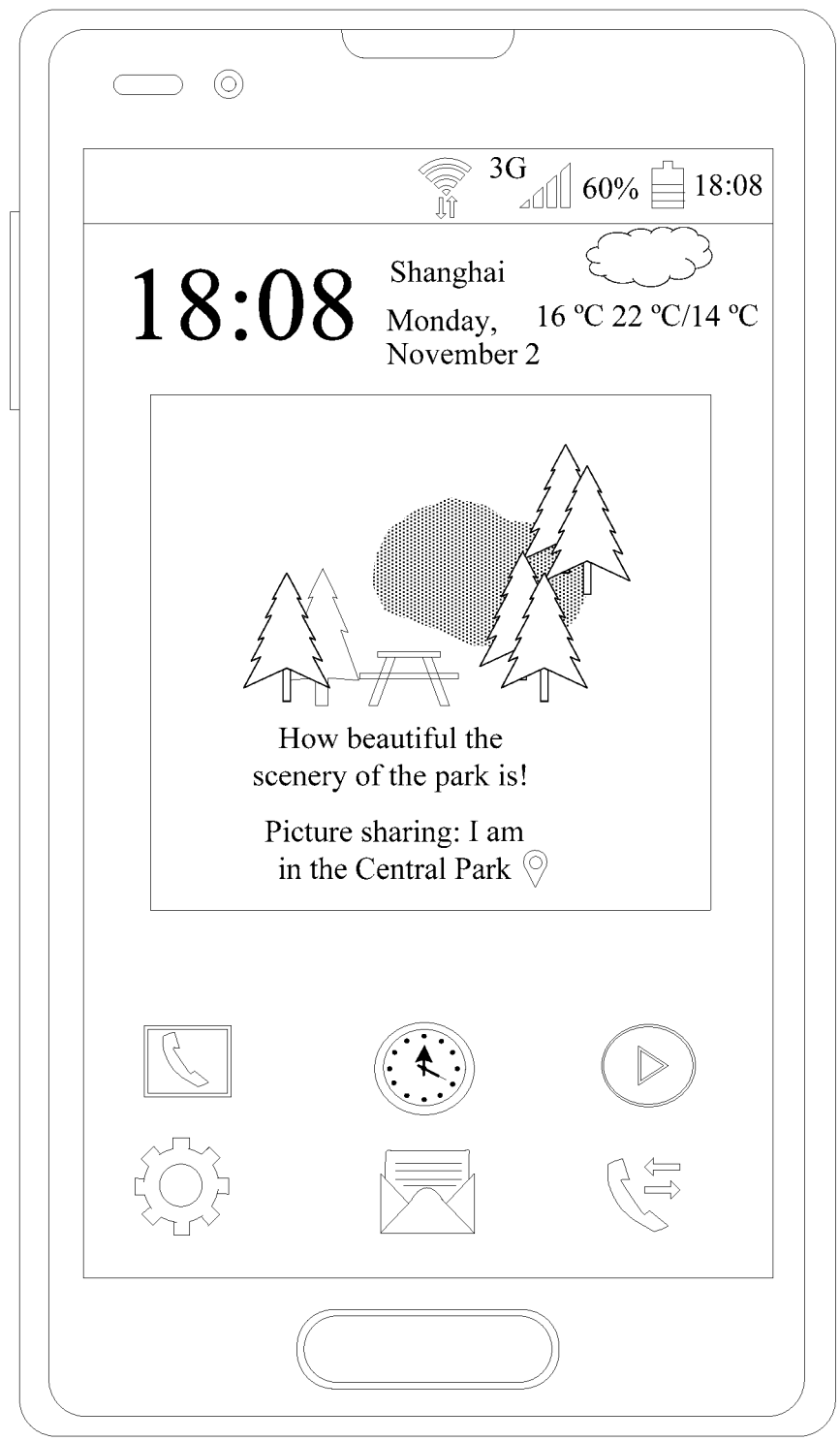
FIG. 2 is a schematic diagram of displaying shared information according to Embodiment 1 of this application.
Figure 3:
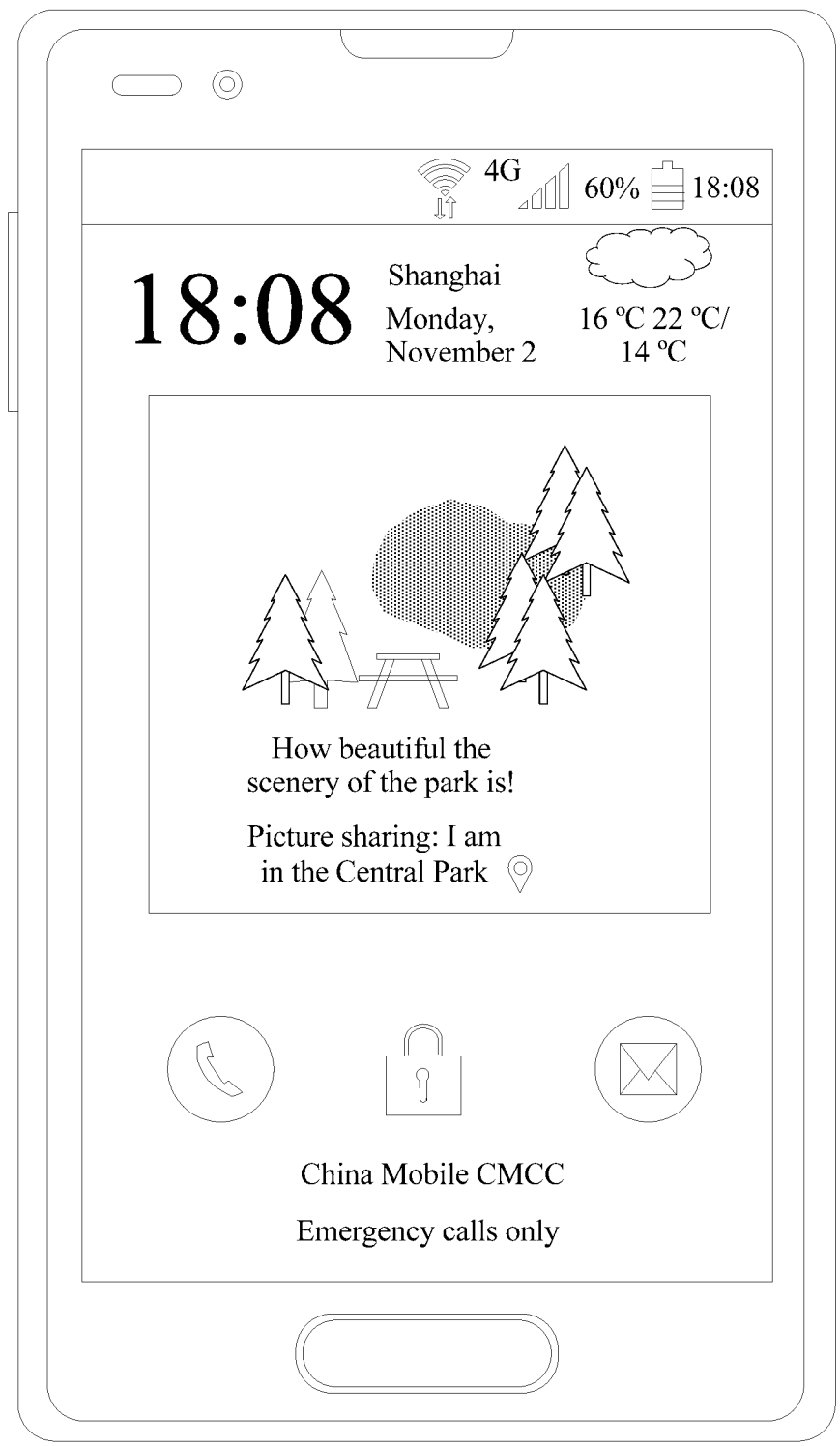
FIG. 3 is a schematic diagram of displaying shared information according to Embodiment 1 of this application.

For example, the identification information is location information of the Central Park. The first user equipment published first shared information including the location information of the Central Park in the Central Park on November 3. The server obtains the first shared information that is published by the first user equipment and that includes the location information of the Central Park, and determines that the second user equipment that has an association relationship with the first user equipment also published second shared information including the location information of the Central Park on November 2, and then the server sends the second shared information that is published by the second user equipment and that includes the location information of the Central Park to the first user equipment. In this case, the first user equipment may display the received second shared information on a home screen. Specifically, as shown in FIG. 2, FIG. 2 is a schematic diagram of displaying shared information according to Embodiment 1 of this application. In FIG. 2, the first user equipment displays the received second shared information on the home screen. The first user equipment may also display the received second shared information on a lock screen interface. Specifically, as shown in FIG. 3, FIG. 3 is a schematic diagram of displaying shared information according to Embodiment 1 of this application. In FIG. 3, the first user equipment displays the received second shared information on the lock screen interface.

If the first user equipment receives multiple pieces of second shared information, and the multiple pieces of second shared information each carry a publishing time, the first user equipment may further display or play the received multiple pieces of second shared information in chronological order of publishing the multiple pieces of second shared information. For example, after the first user equipment receives N pieces of second shared information, the first user equipment displays or plays the N pieces of second shared information in chronological order in which the received N pieces of second shared information are published.

Optionally, the identification information is location information. The N pieces of second shared information received by the first user equipment each carry location information. The first user equipment may further determine, according to a distance between the location information in the second shared information and location information sent by the first user equipment, an order of displaying or playing the N pieces of second shared information. Specifically, the first user equipment determines, according to a distance between the location information included in each of the received N pieces of second shared information and the identification information, an order of displaying or playing the N pieces of second shared information, and displays or plays the N pieces of second shared information in the determined order.

Optionally, if the first user equipment receives both the second shared information of the second user equipment and second shared information of third user equipment, the first user equipment may further determine, according to intimacy between the first user equipment and the second user equipment and intimacy between the first user equipment and the third user equipment, an order of displaying or playing the second shared information. If the intimacy between the second user equipment and the first user equipment is closer, the second shared information of the second user equipment is preferentially displayed or played; or if the intimacy between the third user equipment and the first user equipment is closer, the second shared information of the third user equipment is preferentially displayed or played. The intimacy may be determined according to times or frequency of interaction between user equipments, and more times of interaction or higher frequency of interaction between user equipments indicates closer intimacy. The interaction may be an action such as forwarding or commenting on shared information of each other, or clicking or tapping the like icon below shared information of each other. The foregoing method may be performed by the first user equipment or the second user equipment instead of the server.

Optionally, in the foregoing method embodiment, the first user equipment and the second user equipment may pre-establish an authorization relationship according to the identification information, and only user equipment that establishes the authorization relationship can receive shared information that is published by the other side and that is related to the identification information. For example, the first user equipment has an association relationship with each of the second user equipment and the third user equipment, an authorization relationship is established between the first user equipment and the second user equipment by using identification information A and identification information B, and an authorization relationship is established between the first user equipment and the third user equipment by using identification information C. If the first user equipment publishes the identification information A, the server determines the second user equipment and the third user equipment that each have an association relationship with the first user equipment, but only the second user equipment establishes an authorization relationship with the first user equipment by using the identification information A, the server sends, to the first user equipment, shared information that is found in shared information published by the second user equipment and that is related to the identification information A. For the third user equipment, even if the third user equipment published shared information that is related to the identification information A, the server does not search the third user equipment for the shared information related to the identification information A for sending the shared information related to the identification information A to the first user equipment.

According to the method provided in this embodiment of the present invention, after the identification information sent by the first user equipment is obtained, the second shared information related to the identification information is determined from the shared information published by the second user equipment, and then the determined second shared information related to the identification information is sent to the first user equipment. Therefore, according to the method in this embodiment of the present invention, the second shared information of the second user equipment can be received by the first user equipment that has the same identification information as the second user equipment. In addition, the first user equipment obtains the second shared information related to the identification information that is sent by the first user equipment, so that the first user equipment is prevented from screening the shared information, and the first user equipment can more efficiently obtain the shared information related to the identification information that is sent by the first user equipment.

Figure 4:
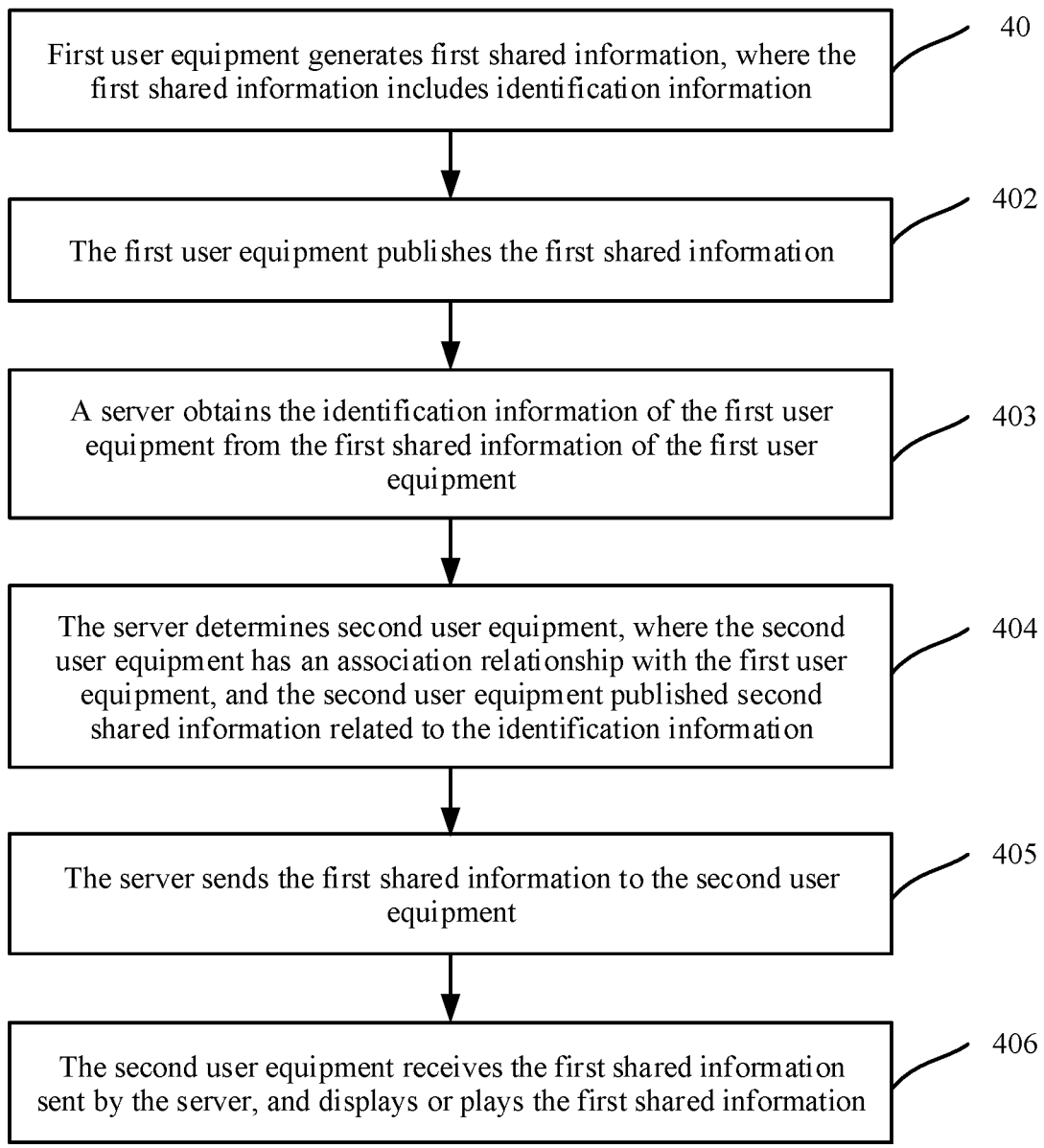
FIG. 4 is a schematic flowchart of an information processing method according to Embodiment 2 of this application.

As shown in FIG. 4, FIG. 4 is a schematic flowchart of an information processing method according to Embodiment 2 of this application.

Referring to FIG. 4, the method specifically includes the following steps.

Step 401: First user equipment generates first shared information, where the first shared information includes identification information.

Step 402: The first user equipment publishes the first shared information.

Step 403: A server obtains the identification information of the first user equipment from the first shared information of the first user equipment.

Step 404: The server determines second user equipment, where the second user equipment has an association relationship with the first user equipment, and the second user equipment published second shared information related to the identification information.

Step 405: The server sends the first shared information to the second user equipment.

It should be noted that in this embodiment of the present invention, step 403 to step 405 may be performed by the first user equipment or the server. For ease of description, only the server is used as an example for description herein. When step 403 to step 405 are performed by the first user equipment, reference may be made to the description in this embodiment of the present invention, and details are not described herein.

Step 406: The second user equipment receives the first shared information sent by the server, and displays or plays the first shared information.

It should be noted that in this embodiment of the present invention, the second user equipment may replace the server to perform the method. For step 403 performed by the second user equipment, reference may be made to the description in this embodiment. Step 404 becomes: the second user equipment determines that the second user equipment has an association relationship with the first user equipment and published second shared information related to the identification information. Step 405 may be skipped without being performed. Step 406 becomes: the second user equipment displays or plays the second shared information.

In step 401, the identification information included in the first shared information generated by the first user equipment may be a point of interest, location information, time information, or the like.

In addition, the first shared information may include at least one of the following:

text information; picture information; audio information; or video information.

In step 402, the first user equipment may publish the first shared information including the identification information by using a social application program.

For example, the first user equipment may send the first shared information such as picture information, text information, audio information, and video information to a network by using the social application program installed in the first user equipment, where the first shared information includes the identification information. Generally, in a social application program, the second user equipment that has a friend relationship with the first user equipment may display, in a social application program of the second user equipment, the first shared information sent by the first user equipment. For example, the first user equipment publishes a picture including identification information A through the network when traveling, and in this case, the second user equipment that establishes a friend relationship with the first user equipment may see and display, by using the social application program, the picture that includes the identification information A and that is published by the first user equipment.

When publishing the first shared information, the first user equipment may further publish an identifier of the social application program at the same time.

Optionally, when publishing the first shared information including the identification information by using the social application program, the first user equipment sends a notification message to the server, so that the server determines that the first user equipment has published the first shared information.

When publishing the first shared information, the first user equipment may further publish an identifier of a corresponding social application program. The identifier of the social application program may be information such as a name of the social application program.

In step 403, the first user equipment publishes the first shared information, so that the server is triggered to obtain the identification information in the first shared information and perform a subsequent step.

The server may determine, by using the social application program in which the first user equipment publishes the first shared information, the first shared information published by the first user equipment.

The server may periodically detect whether the social application program has shared information published by the first user equipment, and once the server finds that the first user equipment publishes shared information, the server may detect whether the identification information exists in the shared information.

Optionally, the server may further determine, by using the notification message sent by the first user equipment, that the first user equipment publishes the first shared information in the social application program.

After obtaining the first shared information published by the first user equipment, the server may determine the identification information according to the first shared information.

In step 404, the second shared information may include at least one of the following:

text information; picture information; audio information; or video information.

After determining the identification information, the server may determine user equipment that has an association relationship with the first user equipment according to the identification information and the association relationship. In an actual implementation, there may be multiple user equipments that have an association relationship with the first user equipment.

In this embodiment of the present invention, the association relationship indicates that a mapping relationship is pre-established between the first user equipment and the second user equipment. A specific association relationship may indicate that a communication identifier of the second user equipment exists in an address book of the first user equipment, and a communication identifier of the first user equipment exists in an address book of the second user equipment. Alternatively, the association relationship may indicate that there is a friend relationship between the first user equipment and the second user equipment in a social application program, or the first user equipment and the second user equipment register with a public server and are associated with each other, and so on. Certainly, the association relationship may be a relationship in another form, and this is not limited in this embodiment of the present invention. The association relationship may be saved in the server in a form of a list or a text; or the association relationship may be saved in user equipment (such as the first user equipment and/or the second user equipment), and the server obtains the association relationship from the user equipment.

The server may determine, by using the social application program, the second user equipment that published the second shared information related to the identification information and that is in the user equipments that have an association relationship with the first user equipment.

For example, the identification information is AC Milan. After the first user equipment publishes the first shared information including "AC Milan", the server may determine that "AM Milan" is included in the first shared information published by the first user equipment, and determines that "AC Milan" is the identification information. When determining that the second user equipment in the user equipments that have an association relationship with the first user equipment published second shared information including "AC Milan", the server sends the first shared information that is published by the first user equipment and that includes "AC Milan" to the second user equipment.

For example, the identification information is badminton. After the first user equipment publishes the first shared information including "badminton", the server may determine that the identification information in the first shared information published by the first user equipment is "badminton". The server determines the second user equipment, where the second user equipment has an association relationship with the first user equipment, and the second user equipment published second shared information related to "badminton", and then the server sends, to the second user equipment, the shared information that is published by the first user equipment and that is related to "badminton".

In step 405, when sending the first shared information to the second user equipment, the server may further send an identifier of a social application program corresponding to the first shared information that is published by the first user equipment. The identifier of the social application program may be information such as a name of the social application program.

When the server sends the first shared information to the second user equipment, display attribute information may be carried in the first shared information, and the display attribute information is used for instructing the second user equipment to display the first shared information in a specified display interface. For example, the display attribute information is a lock screen interface, and when receiving the first shared information, the second user equipment uses the first shared information as an element of the lock screen interface and generates the lock screen interface, so as to display the first shared information. Optionally, the display attribute information may also be a home screen interface, an idle interface, a pop-up window interface, or the like.

In step 406, if the second user equipment receives multiple pieces of first shared information, the second user equipment may further display or play the received multiple pieces of first shared information in chronological order in which the multiple pieces of first shared information are published.

According to the method provided in this embodiment of the present invention, after the identification information is obtained from the first shared information of the first user equipment, the first shared information is sent to the second user equipment that has an association relationship with the first user equipment and that published the second shared information related to the identification information. According to the method in this embodiment of the present invention, the first shared information published by the first user equipment can be accurately sent to the second user equipment that may be interested in the first shared information, so that the second user equipment is prevented from screening the shared information, and the second user equipment can more efficiently obtain the shared information related to the identification information that is sent by the second user equipment.

Based on a same conception, Embodiment 3 of this application provides an information processing apparatus 500 that is configured to perform the method procedure of the foregoing Embodiment 1.

It should be noted that in this embodiment of the present invention, the information processing apparatus 500 may be second user equipment or a server. The second user equipment may be a wireless terminal or a wired terminal, for example, may be a mobile phone, a computer, a tablet computer, a personal digital assistant, a mobile Internet device, a wearable device, an e-book reader, and the like. The server may be a wireless device or a wired device, for example, may be a device such as a computer. The server may be an x86 server or a non-x86 server.

Figure 5:
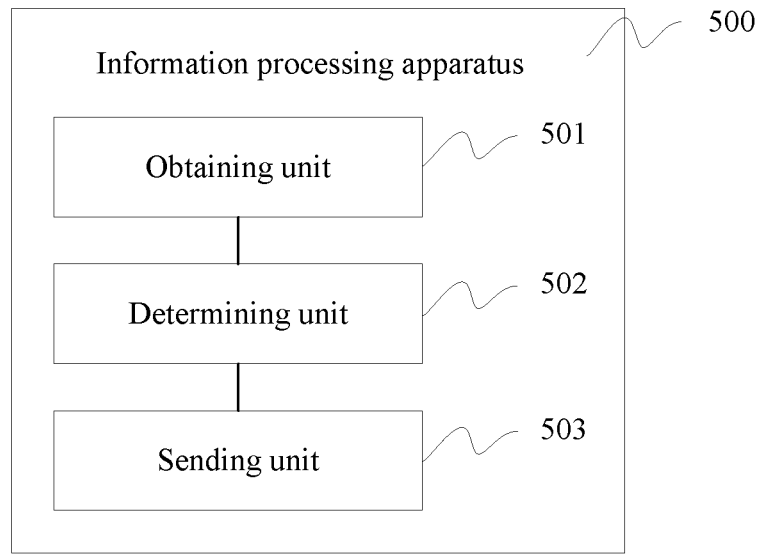
FIG. 5 is a schematic structural diagram of an information processing apparatus according to Embodiment 3 of this application.

As shown in FIG. 5, the apparatus includes:
an obtaining unit 501, configured to obtain identification information of first user equipment;
a determining unit 502, configured to determine second shared information, where the second shared information includes the identification information and is published by second user equipment that has an association relationship with the first user equipment; and
a sending unit 503, configured to send the second shared information to the first user equipment.

Optionally, the sending unit 503 is further configured to:
send, to the first user equipment, the second shared information carrying display attribute information, where the display attribute information is used for instructing the first user equipment to display the second shared information in a specified display interface.

Optionally, the second shared information includes one or more of the following:
text information;
picture information;
audio information; or
video information.

According to the apparatus provided in this embodiment of the present invention, after the identification information sent by the first user equipment is obtained, the second shared information related to the identification information is determined from shared information published by the second user equipment that is associated with the first user equipment, and then the determined second shared information related to the identification information is sent to the first user equipment. Therefore, according to the method in this embodiment of the present invention, message can be published based on the identification information, and in this way, association and attention between the associated user equipments are further promoted. In addition, the first user equipment obtains the second shared information related to the identification information that is sent by the first user equipment, so that the first user equipment is prevented from screening the shared information, and the first user equipment can more efficiently obtain the shared information related to the identification information that is sent by the first user equipment.

Based on a same conception, Embodiment 4 of this application provides an information processing apparatus 600 that is configured to perform the method procedure of the foregoing Embodiment 1. It should be noted that in this embodiment of the present invention, the information processing apparatus 600 may be first user equipment. The first user equipment may be a wireless terminal or a wired terminal, for example, may be a mobile phone, a computer, a tablet computer, a personal digital assistant, a mobile Internet device, a wearable device, an e-book reader, and the like.

Figure 6:
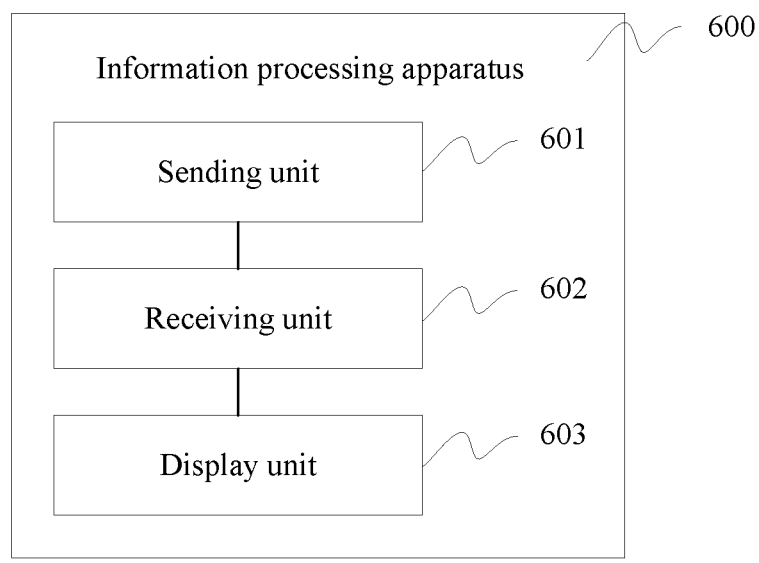
FIG. 6 is a schematic structural diagram of an information processing apparatus according to Embodiment 4 of this application.

As shown in FIG. 6, the apparatus includes:
a sending unit 601, configured to send identification information;
a receiving unit 602, configured to receive second shared information; and
a display unit 603, configured to display or play the second shared information in a standby screen, where the standby screen includes a lock screen interface and a home screen interface, and the second shared information includes the identification information and is published by second user equipment that has an association relationship with first user equipment.

Optionally, the identification information is location information;
the receiving unit 602 is specifically configured to:
receive N pieces of second shared information, where N is a positive integer; and
the display unit 603 is specifically configured to:
determine, according to a distance between location information included in each of the received N pieces of second shared information and the identification information, an order of displaying or playing the N pieces of second shared information, and display or play the N pieces of second shared information in the determined order.

Optionally, the receiving unit 602 is specifically configured to:
receive N pieces of second shared information sent by the server; and
the display unit 603 is specifically configured to:
display or play the N pieces of second shared information in chronological order in which the received N pieces of second shared information are published.

Optionally, the second shared information is shared information published by the second user equipment in a social application program.

Optionally, the receiving unit 602 is further configured to:
receive the second shared information carrying display attribute information, where the display attribute information is used for instructing to display the second shared information in a specified display interface; and
the display unit 603 is specifically configured to display the second shared information in the display interface indicated in the display attribute information.

Optionally, the second shared information includes at least one of the following:
text information;
picture information;
audio information; or
video information.

Based on a same conception, Embodiment 5 of this application provides an information processing apparatus 700 that is configured to perform the method procedure of the foregoing Embodiment 2.

It should be noted that in this embodiment of the present invention, the information processing apparatus 700 may be first user equipment or a server.

Figure 7:
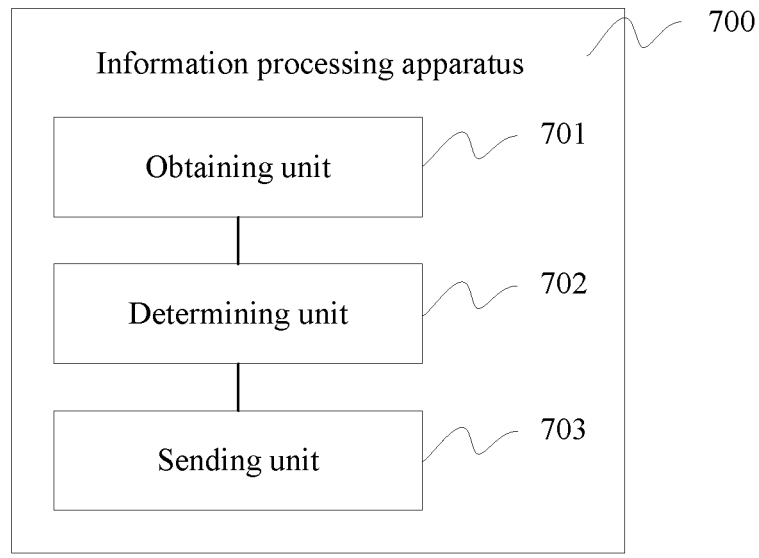
FIG. 7 is a schematic structural diagram of an information processing apparatus according to Embodiment 5 of this application.

As shown in FIG. 7, the apparatus includes:
an obtaining unit 701, configured to obtain identification information of first user equipment from first shared information of the first user equipment;
a determining unit 702, configured to determine second user equipment, where the second user equipment has an association relationship with the first user equipment, and the second user equipment published second shared information related to the identification information; and a sending unit 703, configured to send the first shared information to the second user equipment.

According to the apparatus provided in this embodiment of the present invention, after the identification information is obtained from the first shared information of the first user equipment, the first shared information is sent to the second user equipment that has an association relationship with the first user equipment and that published the second shared information related to the identification information. According to the apparatus in this embodiment of the present invention, the first shared information published by the first user equipment can be accurately sent to the second user equipment that may be interested in the first shared information, so that the second user equipment is prevented from screening the shared information, and the second user equipment can more efficiently obtain the shared information related to the identification information that is sent by the second user equipment.

Optionally, the sending unit 703 is further configured to:

send, to the second user equipment, the first shared information carrying display attribute information, where the display attribute information is used for instructing the second user equipment to display the first shared information in a specified display interface.

Optionally, the first shared information includes at least one of the following:

text information;
picture information;
audio information; or
video information.

Based on a same conception, Embodiment 6 of this application provides an information processing apparatus 800 that is configured to perform the method procedure of the foregoing Embodiment 2. It should be noted that in this embodiment of the present invention, the information processing apparatus 800 may be second user equipment.

Figure 8:
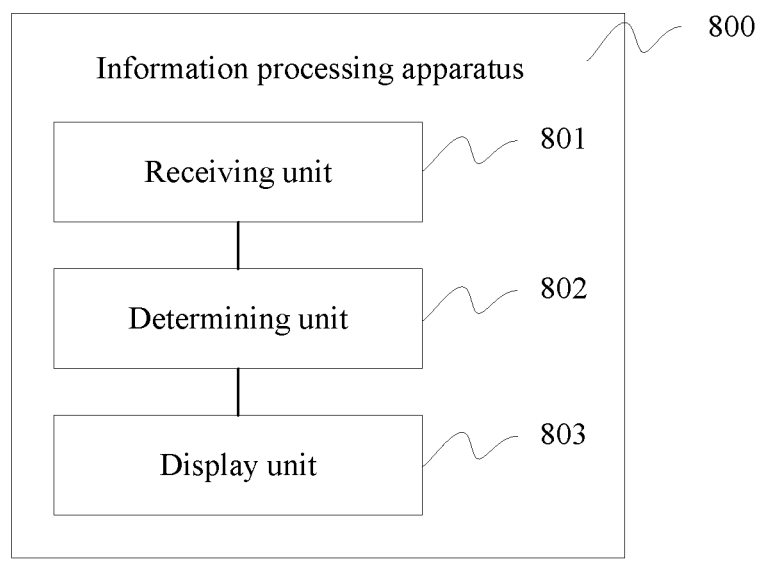
FIG. 8 is a schematic structural diagram of an information processing apparatus according to Embodiment 6 of this application.

As shown in FIG. 8, the apparatus includes:

a receiving unit 801, configured to receive first shared information published by first user equipment, where the first shared information includes identification information;

a determining unit 802, configured to confirm that second user equipment has an association relationship with the first user equipment and published second shared information related to the identification information; and a display unit 803, configured to display the first shared information in a standby screen. Preferably, the standby screen includes a lock screen interface and a home screen interface.

Based on a same conception, Embodiment 7 of this application provides an information processing device 900 that is configured to perform the method procedure of the foregoing Embodiment 1.

Figure 9:
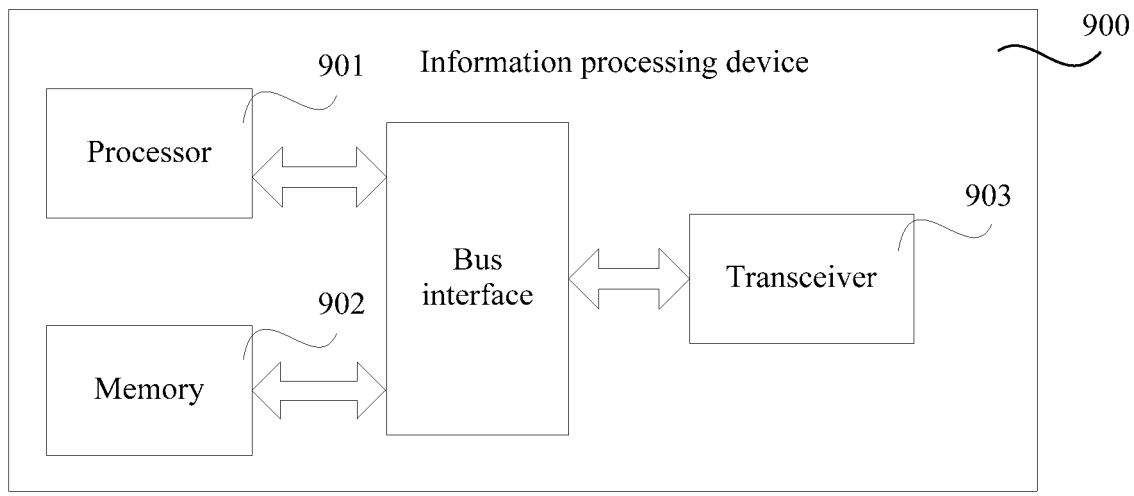
FIG. 9 is a schematic structural diagram of an information processing device according to Embodiment 7 of this application.

As shown in FIG. 9, the information processing device 900 includes a processor 901, a memory 902, and a transceiver 903.

It should be noted that in this embodiment of the present invention, the information processing device 900 may be second user equipment or a server.

The processor 901 runs a computer program stored in the memory 902, to perform the following procedure:

obtaining identification information of first user equipment;

determining second shared information, where the second shared information includes the identification information and is published by second user equipment that has an association relationship with the first user equipment; and instructing the transceiver 903 to send the second shared information to the first user equipment.

Optionally, the processor 901 is further configured to:

add display attribute information to the second shared information, where the display attribute information is used for instructing the first user equipment to display the second shared information in a specified display interface; and instruct the transceiver to send, to the first user equipment, the second shared information carrying the display attribute information.

Optionally, the second shared information includes one or more of the following:

text information;
picture information;
audio information; or
video information.

A bus interface may further be included in FIG. 9, and the bus interface may include any quantity of interconnecting buses and bridges, which specifically link together various circuits of one or more processors represented by the processor and a memory represented by the memory. The bus interface may further link together various other circuits, such as a peripheral device, a voltage regulator, and a power management circuit. This is well known in the art, and therefore is not further described in this specification. The bus interface provides an interface. The transceiver provides a unit that communicates with various other devices on a transmission medium. The processor is responsible for bus architecture management and general processing, and the memory may store data used when the processor performs an operation. Optionally, the information processing device may further include a display and an input device that are configured to provide human-computer interaction. The transceiver may be further configured to: connect to another device in a network, and receive the identification information of the first user equipment, for example, obtaining location information of the first user equipment from a location server, or obtaining a point of interest of the first user equipment from a social server, or the like.

Based on a same conception, Embodiment 8 of this application provides an information processing device 1000 that is configured to perform the method procedure of the foregoing Embodiment 1. It should be noted that in this embodiment of the present invention, the information processing device 1000 may be first user equipment or a server.

Figure 10:
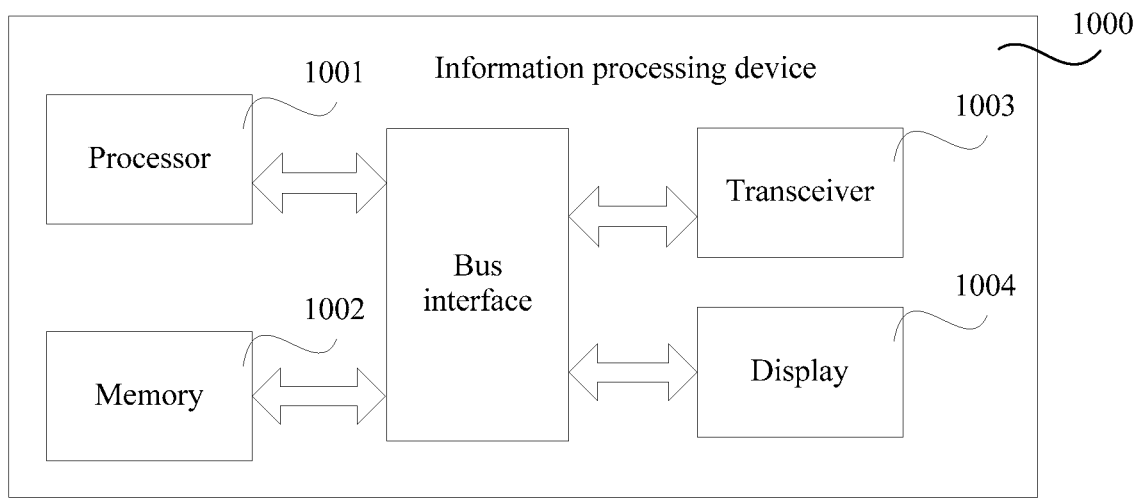
FIG. 10 is a schematic structural diagram of an information processing device according to Embodiment 8 of this application.

As shown in FIG. 10, the information processing device 1000 includes a processor 1001, a memory 1002, a transceiver 1003, and a display 1004.

The processor 1001 reads a computer program stored in the memory 1002, executes the computer program, and instructs the transceiver 1003 and the display 1004 to work.

The transceiver 1003 is configured to: send identification information, and receive second shared information.

The display 1004 is configured to display or play the shared information in a standby screen, where the standby screen includes a lock screen interface and a home screen interface, and the second shared information includes the identification information and is published by second user equipment that has an association relationship with first user equipment.

Optionally, the identification information is location information;

the transceiver 1003 is specifically configured to:
receive N pieces of second shared information, where N is a positive integer; and
the processor 1001 is specifically configured to:
determine, according to a distance between location information included in each of the received N pieces of second shared information and the identification information, an order of displaying or playing the N pieces of second shared information; and instruct, in the determined order, the display 1004 to display or play the N pieces of second shared information.

Optionally, the transceiver 1003 is specifically configured to:

receive N pieces of second shared information sent by the server; and the processor 1001 is specifically configured to:

instruct, in chronological order in which the received N pieces of second shared information are published, the display 1004 to display or play the N pieces of second shared information.

Optionally, the second shared information is shared information published by the second user equipment in a social application program.

Optionally, the transceiver 1003 is further configured to:

receive the second shared information carrying display attribute information, where the display attribute information is used for instructing the first user equipment to display the second shared information in a specified display interface; and the processor 1001 is further configured to instruct the display to display the second shared information in the display interface specified in the display attribute information.

Optionally, the second shared information includes at least one of the following:

text information;
picture information;
audio information; or
video information.

A bus interface may further be included in FIG. 10, and the bus interface may include any quantity of interconnecting buses and bridges, which specifically link together various circuits of one or more processors represented by the processor and a memory represented by the memory. The bus interface may further link together various other circuits, such as a peripheral device, a voltage regulator, and a power management circuit. This is well known in the art, and therefore is not further described in this specification. The bus interface provides an interface. The transceiver provides a unit that communicates with various other devices on a transmission medium. The processor is responsible for bus architecture management and general processing, and the memory may store data used when the processor performs an operation.

Based on a same conception, Embodiment 9 of this application provides an information processing device 1100 that is configured to perform the method procedure of the foregoing Embodiment 2. It should be noted that in this embodiment of the present invention, the information processing device 1100 may be first user equipment or a server.

Figure 11:
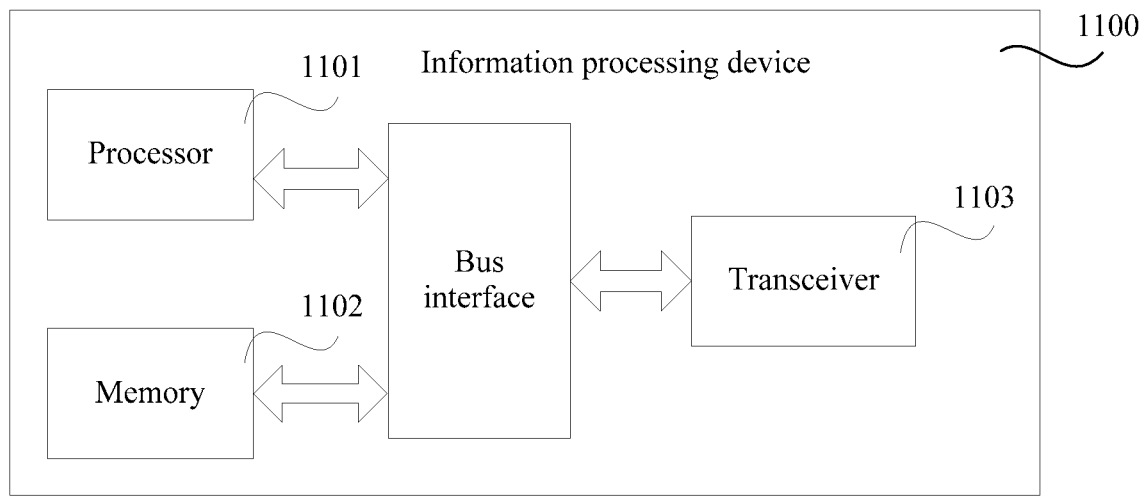
FIG. 11 is a schematic structural diagram of an information processing device according to Embodiment 9 of this application.

As shown in FIG. 11, the information processing device 1100 includes a processor 1101, a memory 1102, and a transceiver 1103.

The memory 1102 is configured to store a computer program.

The processor 1101 reads the computer program stored in the memory 1102, to perform the following procedure:

obtaining identification information of first user equipment from first shared information of the first user equipment;

determining second user equipment, where the second user equipment has an association relationship with the first user equipment, and the second user equipment published second shared information related to the identification information; and instructing the transceiver 1103 to send the first shared information to the second user equipment.

Optionally, the processor 1101 is further configured to:

send, to the second user equipment, the first shared information carrying display attribute information, where the display attribute information is used for instructing the second user equipment to display the first shared information in a specified display interface.

Optionally, the first shared information includes at least one of the following:

text information;
picture information;
audio information; or
video information.

A bus interface may further be included in FIG. 11, and the bus interface may include any quantity of interconnecting buses and bridges, which specifically link together various circuits of one or more processors represented by the processor and a memory represented by the memory. The bus interface may further link together various other circuits, such as a peripheral device, a voltage regulator, and a power management circuit. This is well known in the art, and therefore is not further described in this specification. The bus interface provides an interface. The transceiver provides a unit that communicates with various other devices on a transmission medium. The processor is responsible for bus architecture management and general processing, and the memory may store data used when the processor performs an operation.

Based on a same conception, Embodiment 10 of this application provides an information processing device 1200 that is configured to perform the method procedure of the foregoing Embodiment 2. It should be noted that in this embodiment of the present invention, the information processing device 1200 may be second user equipment.

Figure 12:
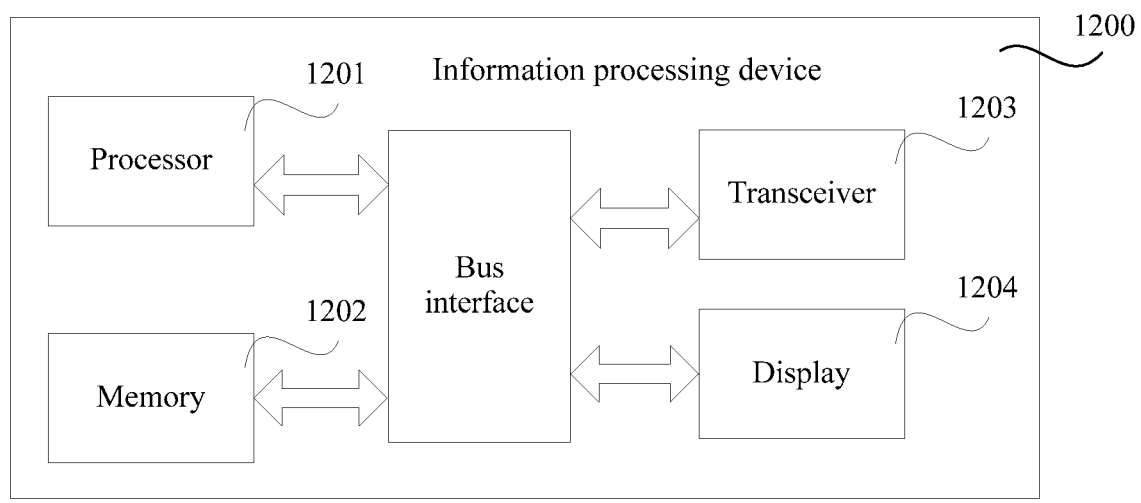
FIG. 12 is a schematic structural diagram of an information processing device according to Embodiment 10 of this application.

As shown in FIG. 12, the information processing device 1200 includes a processor 1201, a memory 1202, a transceiver 1203, and a display 1204.

The memory 1202 is configured to store a computer program.

The processor 1201 is configured to execute the computer program stored in the memory 1202, to perform the following procedure:

instructing the transceiver 1203 to receive first shared information published by first user equipment, where the first shared information includes identification information;

obtaining the identification information, and confirming that second user equipment has an association relationship with the first user equipment and published second shared information related to the identification information; and instructing the display 1204 to display the first shared information in a standby screen, where the first shared information is preferably displayed in a lock screen interface or a home screen interface.

A bus interface may further be included in FIG. 12, and the bus interface may include any quantity of interconnecting buses and bridges, which specifically link together various circuits of one or more processors represented by the processor and a memory represented by the memory. The bus interface may further link together various other circuits, such as a peripheral device, a voltage regulator, and a power management circuit. This is well known in the art, and therefore is not further described in this specification. The bus interface provides an interface. The transceiver provides a unit that communicates with various other devices on a transmission medium. The processor is responsible for bus architecture management and general processing, and the memory may store data used when the processor performs an operation.

In conclusion, according to the method and the apparatus provided in the embodiments of the present invention, after the identification information sent by the first user equipment is obtained, the shared information related to the identification information is determined from shared information published by an associated user equipment, so that the determined shared information related to the identification information is sent to the first user equipment. In addition, the first user equipment obtains the shared information related to the identification information that is sent by the first user equipment, so that the first user equipment is prevented from screening the shared information, and the first user equipment can more efficiently obtain the shared information related to the identification information that is sent by the first user equipment.

A person skilled in the art should understand that the embodiments of the present invention may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage channel (including but not limited to a disk memory, an optical memory, and the like) that include computer-usable program code.

This application is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine instruction, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of the present disclosure. This application is intended to cover these modifications and variations of the present disclosure provided that they fall within the scope of protection defined by the following claims and their equivalent technologies.

What is claimed is:

1. An information processing method, wherein the method comprises:
    sending, by first user equipment, identification information;
    receiving, by the first user equipment, first shared information;
    receiving, by the first user equipment, second shared information, wherein the second shared information is published by a second user equipment before the first user equipment sends the identification information;
    displaying the first shared information in a lock screen interface, wherein the first shared information comprises the identification information and is published by the second user equipment that has an association relationship with the first user equipment;
    displaying both the first shared information and the second shared information in the lock screen interface in chronological order in which the first shared information and the second shared information are published;
    receiving M pieces of third shared information, the third shared information including the identification information; and
    displaying the M pieces of the third shared information in the lock screen interface in chronological order in which the M pieces of third shared information are published,
    wherein M is an integer and is preset by the first user equipment.

2. The method according to claim 1, wherein the identification information is location information; and the method further comprises:
    displaying both the first shared information the second shared information in the lock screen interface in an order according to a distance between the identification information and location information in the first shared information, and to a distance between the identification information and location information comprised in the second shared information.

3. The method according to claim 1,
    wherein the first shared information is shared information published by the second user equipment in a first social application program, the second shared information is shared information published by the second user equipment in a second social application program or the second shared information is shared information published by a third user equipment in the first social application program, the second social application program being different from the first social application program.

4. The method according to claim 1, wherein
    the first shared information carries display attribute information, and the display attribute information is used for instructing the first user equipment to display the first shared information in the lock screen interface.

5. The method according to claim 1, wherein the first shared information comprises at least one of the following:
    text information;
    picture information;
    audio information; or
    video information.

6. The method according to claim 1, wherein the sending, by first user equipment, identification information comprises sending, by the first user equipment, a third shared information which carries the identification information.

7. The method according to claim 1, wherein the identification information is sent to a server, the first shared information is received from the server.

8. An information processing device, wherein the device comprises:
   at least one processor, a memory, a display, and a transceiver;
   the memory is configured to store a computer program; and
   the at least one processor runs the computer program to perform:
      instructing the transceiver to send identification information and receive first shared information;
      instructing the transceiver to receive second shared information, wherein the second shared information is published by a second user equipment before the first user equipment sends the identification information;
      instructing the display to display the first shared information in a lock screen interface, wherein the first shared information comprises the identification information and is published by the second user equipment that has an association relationship with first user equipment;
      instructing the display to display both the first shared information and the second shared information in the lock screen interface in chronological order in which the first shared information and the second shared information are published;
      receiving M pieces of third shared information, the third shared information including the identification information; and
      displaying the M pieces of the third shared information in the lock screen interface in chronological order in which the M pieces of third shared information are published,
      wherein M is an integer and is preset by the first user equipment.

9. The device according to claim 8, wherein the identification information is location information; and
   the processor is configured to:
      instruct the display to display both the first shared information the second shared information in the lock screen interface in an order according to a distance between the identification information and location information in the first shared information, and to a distance between the identification information and location information comprised in the second shared information.

10. The device according to claim 8,
    the first shared information is shared information published by the second user equipment in a first social application program, the second shared information is shared information published by the second user equipment in a second social application program or the second shared information is shared information published by a third user equipment in the first social application program, the second social application program being different from the first social application program.

11. The device according to claim 8, wherein the first shared information carries display attribute information, and the display attribute information is used for instructing the first user equipment to display the first shared information in the lock screen interface.

12. The device according to claim 8, wherein the first shared information comprises at least one of the following:
    text information;
    picture information;
    audio information; or
    video information.

13. The device according to claim 8, wherein the transceiver is configured to:
    send a third shared information which carries the identification information.

14. The device according to claim 8, wherein the identification information is sent to a server, the first shared information is received from the server.

15. A non-transitory computer readable medium comprising instructions which, when executed by a first user equipment, cause the first user equipment to perform:
    sending identification information;
    receiving first shared information, and displaying the first shared information in a lock screen interface, and the first shared information comprises the identification information and is published by a second user equipment that has an association relationship with the first user equipment;
    receiving second shared information, wherein the second shared information is published by the second user equipment before the first user equipment sends the identification information;
    displaying both the first shared information and the second shared information in the lock screen interface in chronological order in which the first shared information and the second shared information are published;
    receiving M pieces of third shared information, the third shared information including the identification information; and
    displaying the M pieces of the third shared information in the lock screen interface in chronological order in which the M pieces of third shared information are published,
    wherein M is an integer and is preset by the first user equipment.

* * * * *